(12) United States Patent
Broos et al.

(10) Patent No.: US 8,080,617 B2
(45) Date of Patent: Dec. 20, 2011

(54) ALIPHATIC POLYESTER-AMIDE COMPOSITIONS AND A PROCESS FOR PRODUCING THE SAME

(75) Inventors: Rene Broos, Bornem (BE); Rudolf J. Koopmans, Kruibeke (BE)

(73) Assignee: Dow Global Technologies LLC

( * ) Notice: Subject to any disclaimer, the term of this patent is extended or adjusted under 35 U.S.C. 154(b) by 799 days.

(21) Appl. No.: 11/917,164

(22) PCT Filed: Jun. 14, 2006

(86) PCT No.: PCT/IB2006/004005
§ 371 (c)(1), (2), (4) Date: Dec. 11, 2007

(87) PCT Pub. No.: WO2007/099397
PCT Pub. Date: Sep. 7, 2007

(65) Prior Publication Data
US 2008/0214743 A1     Sep. 4, 2008

Related U.S. Application Data

(60) Provisional application No. 60/690,971, filed on Jun. 16, 2005.

(51) Int. Cl.
C08G 63/685 (2006.01)
C08G 69/48 (2006.01)
C08L 67/00 (2006.01)
C08L 77/12 (2006.01)

(52) U.S. Cl. ........ 525/420; 525/434; 525/437; 525/448; 525/450

(58) Field of Classification Search ............... 525/420, 525/434, 437, 448, 450
See application file for complete search history.

(56) References Cited

U.S. PATENT DOCUMENTS

| | | | |
|---|---|---|---|
| 3,025,323 A | 3/1962 | Rose et al. | |
| 4,209,607 A | 6/1980 | Shalaby et al. | |
| 6,172,167 B1 | 1/2001 | Stapert et al. | |
| 6,353,084 B1 | 3/2002 | Warzelhan et al. | |
| 2007/0161773 A1* | 7/2007 | Loontjens | 528/196 |
| 2008/0241528 A1 | 10/2008 | Broos et al. | |
| 2010/0137478 A1 | 6/2010 | White et al. | |

FOREIGN PATENT DOCUMENTS

| | | |
|---|---|---|
| CA | 2317747 | 7/1999 |
| EP | 1 283 235 A2 | 12/2003 |
| GB | 1 281 752 | 7/1972 |
| WO | WO 99/35179 A1 | 7/1999 |
| WO | WO 01/23457 A1 | 4/2001 |
| WO | WO 03/070807 A1 | 8/2003 |
| WO | WO 2008/101051 | 8/2008 |
| WO | WO 2008/112833 | 9/2008 |
| WO | WO 2008/112834 | 9/2008 |
| WO | WO 2008/150970 | 12/2008 |

OTHER PUBLICATIONS

Francesca Signori et al, "Synthesis and Characterization of Segmented Poly(ether ester)s Containing H-Bonding Units", Macromolecular Chemistry and Physics, 2003, 1971-1981, 204 No. 16, Wiley-VCH Verlag GmbH & Co. KGaA, Weinheim.

Hendrik R. Stapert et al, "Environmentally Degradable Aliphatic Poly(ester-amide)s Based on Short, Symmetrical and Uniform Bisamide-diol Blocks, 1, Synthesis and Interchange Reactions",Macromol Chem. Phys., 1999, 1921-1929, 200, No. 8, Wiley-VCH Verlag GmbH.

R. Jetter et al, "Long-chain Alkanediols from *Myricaria germanica* Leaf Cuticular Waxes", Phytochemistry 55, 2000, 169-176, Elsevier Science Ltd.

Martin E. Rogers et al, "Introduction to Synthetic Methods in Step-Growth Polymers", Synthetic Methods in Step-Growth Polymers, 2003, 1-16, Ch. 1, John Wiley & Sons, Inc.

Ralf Timmermann, "Polyesteramides", Biopolymers, 2002, 315-327, vol. 4—Polyesters III: Applications and Commercial Products, Doi and Steinbuchel Eds., Wiley-VCH.

Shitomi Katayama et al, "Synthesis of Alternating Polyamideurethanes by Reacting Diisocyanates with N,N'-Di-(6-hydroxycaproyl) alkylenediamines and N-hydroxy-alkyl-6-hydroxycaproamide", Journal of Applied Polymer Science, 1971, 775-796, vol. 15, John Wiley & Sons, Inc.

Van Krevelen, "Properties of Polymers", Elsevier, 1976, p. 389.

F. Jouffret et al, "Polyamide Synthesis by Ester Aminolysis. I. A New Route for Nylon-6,6 Synthesis", Journal of Polymer Science: Part A: Polymer Chemistry, 1996, 2363-2370, vol. 34, John Wiley & Sons, Inc.

Lips et al., "Incorporation of different crystallizable amide blocks in segmented poly(ester amide)s", Polymer, 2005, 7834-7842, vol. 46, Elsevier Ltd.

Lips et al., "Synthesis and characterization of poly(ester amide)s containing crystallizable amide segments", Polymer, 2005, 7823-7833, vol. 46, Elsevier Ltd.

Corbin et al., "Chapter 6, Hydrogen-Bonded Supramolecular Polymers: Linear and Network Polymers and Self-Assembling Discotic Polymers", Supramolecular Polymers, 2005, 153-182, $2^{nd}$ Edition, CRC Press.

* cited by examiner

*Primary Examiner* — Ana Woodward

(57) ABSTRACT

The invention is a method for increasing the molecular weight of and optionally providing branching in a polymer which has a first repeat unit, which comprises the residual of a condensation reaction of an aliphatic dicarboxylic acid and either a bisamide diol or a bis diamide diester, and a second repeat unit, which comprises the residual of a condensation reaction of a diol and an aliphatic dicarboxylic acid. The invention is also the branched polymer that can be made by such a method.

21 Claims, No Drawings

ALIPHATIC POLYESTER-AMIDE COMPOSITIONS AND A PROCESS FOR PRODUCING THE SAME

CROSS REFERENCE TO RELATED APPLICATIONS

This application is a 371 of PCT/IB2006/004005 filed Jun. 14, 2006, which claims the benefit of U.S. Provisional Application Ser. No. 60/690,971, filed Jun. 16, 2005.

BACKGROUND OF THE INVENTION

The present invention relates to a process for increasing the molecular weight of an amide ester polymer.

U.S. Pat. No. 6,172,167 discloses amide ester polymers having good mechanical and environmental properties. The polymers of the '167 patent consist of building blocks with the general structure -(CB-VB)- wherein CB represents a block of constant length and VB represents a block of variable length. When the number average molecular weight of the polymer composition of the '167 patent is greater than 10,000 grams per mole, then the polymer compositions have increased strength, stiffness, elasticity and ductility properties and display improved film and fiber forming properties. The process of the '167 patent produces higher molecular weight polymers by heating the polymer to promote chain condensation. However, the rate of such chain condensation slows significantly as the molecular weight of the polymer increases. Therefore, it is time consuming to produce the desirable high molecular weight polymers using the process of the '167 patent. Thus, there remains a need for a more facile method to produce increased molecular weight amide ester polymers of this type.

Alternatively it may be desirable to either increase the molecular or to produced branched high molecular weight crystallizable polyester-amides by using polyfunctional initiators but avoiding gelation of the composition.

SUMMARY OF THE INVENTION

Thus, according to a first embodiment, the instant invention is a method for increasing the molecular weight of a polymer which has a first repeat unit, which comprises the residual of a condensation reaction of either an aliphatic dicarboxylic acid with a bisamide diol or a diol with a diamide diester, and a second repeat unit, which comprises the residual of a condensation reaction of a diol and an aliphatic dicarboxylic acid, provided that at least one, (and preferably one or the other but not both) of the diol or the aliphatic dicarboxylic acid are characterized in that when found independently in a reaction mixture they are relatively volatile and may be distilled out of the reaction mixture. The polymer has a number average molecular weight of less than 2000 g/mol. The polymer is combined with a reactant selected from the group consisting of non-volatile diols (preferable when the polymer comprises a volatile diol) and long chain or high boiling point diccarboxylic acid (preferable when the polymer comprises the residual of a volatile aliphatic dicarboxylic acid and the polymer does not comprise a volatile diol). The reaction temperature is maintained at a level to increase the molecular weight to 4000 g/mol or more (preferably 6000 g/mol or more and more preferably 10,000 g/mol or more) and at least some of the volatile group (diol or diacid) is replaced by the non-volatile reactant.

According to a second embodiment, the invention is a method of increasing the molecular weight and providing branching in a polymer comprising a first repeat unit, which comprises the residual of a condensation reaction of either an aliphatic dicarboxylic acid with a bisamide diol or a diol with a diamide diester, and a second repeat unit, which is the residual of a condensation reaction of a diol and an aliphatic dicarboxylic acid where the polymer has a molecular weight of less than 2000 grams per mole. The polymer is combined with a reactant which is selected from polyols and polyacids (or polyacid esters), where the reactant has at least three of the functional groups —OH, -ester, or —COOH as the case may be. The temperature of the reaction is maintained at a level sufficiently high to form a branched polymer having a molecular weight of 4000 g/mol or more, preferably greater than 6000 g/mol, more preferably greater than 10,000 g/mol.

According to a third embodiment the invention is a polymer that can be made according to the method of the second embodiment.

DETAILED DESCRIPTION OF THE INVENTION

Note that in the formulas shown in this application the oxygen in the repeat unit or portion of repeat units are drawn as occurring on one end of the repeat unit or portion of the repeat unit. However, the oxygen could have been shown on the other end of the repeat unit or portion of the repeat unit and still represented the same actual structure. Therefore, the structures as drawn herein shall be recognized as representing both variants.

In the first embodiment, when the first repeat unit comprises residual of a bisamide diol and the second repeat unit comprises residual of a volatile diol, the first repeat unit may be represented by the structure: —[H1-AA]-, where H1 is —R—CO—NH—Ra—NH—CO—R—O— or —R—NH—CO—R—CO—NH—R—O— where Ra is R or a bond, R is independently in each occurrence an aliphatic or heteroaliphatic, alicyclic or heteroalicyclic or aromatic or heteroaromatic group, preferably R is an aliphatic group of 1 to 10, preferably 1-4 carbon atoms and AA is a —CO—R'—CO—O— where R' is a bond or an aliphatic group, preferably of 1 to 10, preferably 2-4 carbon atoms. The second repeat unit may be represented by the formula -[DV-AA]-, where DV is —[R"—O]— and R" is a an aliphatic or heteroaliphatic, alicyclic or heteroalicyclic or aromatic or heteroaromatic group selected such that R" (OH)$_2$ can be distilled off from the reaction mixture. Preferably, R" is an aliphatic group of 1 to 8, more preferably 2 to 4, carbon atoms. The molecular weight of the polymer is less than 2000 grams per mole.

Thus, according to one representation the polymer may be represented as having the formula HO-D1-O—[—CO-AA1-COO-D1-O—]$_x$—[CO-AA1-CO—O-AD-O]$_y$—H, wherein O-D1-O represents a volatile diol functionality, wherein CO-AA1-CO represents a residual of a aliphatic dicarboxylic acid functionality (preferably short e.g. 6 or fewer carbon atoms), and O-AD-O represents a residual of a preferably short (e.g. preferably 6 or fewer carbon atoms in the diamine) symmetrical, crystallizing amid diol functionality, wherein x and y are the number of each repeat units selected such that the number average molecular weight of the polymer is less than 2,000 grams per mole. Note that while for convenience the repeat units are as shown above, the polymer is not necessarily an AB block copolymer. Rather the polymer will preferably have segments with an average of 2 repeat units of the same type per segments. Order of addition and time of addition of monomers will impact blockiness of the structure.

The method in this instance comprises providing the above polymer with a nonvolatile diol having the formula HO-D2-

OH to form a mixture where D2 is independently in each occurrence an aliphatic or heteroaliphatic, alicyclic or heteroalicyclic or aromatic or heteroaromatic group, preferably D2 is an aliphatic group, at a temperature such that the polymer and the nonvolatile diol react to form a polymer having repeat units —[H1-AA]-, -[DV-AA]-, and -[D2-O-AA]-. The temperature during the reaction is sufficiently high such that at least some of the DV groups will be distilled off during the reaction and replaced by D2-O— groups.

Thus, according to one representation the transformed polymer having the formula HO-D2-O—[—CO-AA1-CO—O-D1,2-O—]$_x$—[CO-AA1-CO—O-AD-O]$_y$—H, wherein O-D2-O represents the residual nonvolatile diol functionality, wherein CO-AA1-CO represents the residual of the aliphatic dicarboxylic acid functionality, wherein O-AD-O represents the residual of the polyamid diol functionality, wherein O-D1,2-O represents the residual of the volatile diol functionality or the nonvolatile diol functionality, wherein x and y are the number of each of the repeat units in the polymer. Note that while for convenience the repeat units are as shown above, the polymer is not necessarily an AB block copolymer. Rather the polymer will preferably have segments with an average of 2 repeat units of the same type per segments. Order of addition and time of addition of monomers will impact blockiness of the structure. The number average molecular weight of the transformed polymer being greater than 4,000 grams per mole.

In the second embodiment, when the first repeat unit comprises residual of a bisamide diol, the first repeat unit may be represented by the structure —[H1-AA]- as discussed above and the second repeat unit has the structure —[R—O-AA]- where R is as defined above. Thus, according to one representation the polymer may have the formula HO-D1-O—[—CO-AA1-CO—O-D-O—]$_x$—[CO-AA1-CO—O-AD-O]$_y$—H, wherein O-D-O represents the residual of a diol functionality, wherein CO-AA1-CO represents the residual of a preferably short aliphatic dicarboxylic acid functionality, wherein O-AD-O represents the residual of a preferably short symmetrical, crystallizing amid diol functionality, wherein x and y are the number of each of the repeat units in the polymer. Note that while for convenience the repeat units are as shown above, the polymer is not necessarily an AB block copolymer. Rather the polymer will preferably have segments with an average of 2 repeat units of the same type per segments. Order of addition and time of addition of monomers will impact blockiness of the structure. The number average molecular weight of the polymer being less than 2,000 grams per mole. The method of this second embodiment comprises contacting the polymer with a polyol having the formula M-(OH)$_n$ or a polyacid or polyacid ester having the formula M-(COOR1)n to form a mixture wherein M is an n valent organic moiety, preferably aliphatic or heteroaliphatic, alicyclic or heteroalicyclic or aromatic or heteroaromatic group, preferably having up to 20 carbon atoms, R1 is hydrogen or an aliphatic group of 1-10 carbon atoms and wherein n is 3 or more, the temperature of the mixture being sufficiently high to produce a transformed material having a branched structure and a number average molecular weight greater than 4000.

Preferably, when the polymer is reacted with the polyol, the transformed material will comprise the following repeat units: —[H1-AA]-, —[R—O-AA]-, and -M-(AA)$_n$-. Thus, according to one representation (with a single polyfunctional moiety M built in the chain, though a plurality of M is possible) the transformed polymer may have the formula HO-D1-O—[—CO-AA1-CO—O-D1-O—]$_x$—[CO-AA1-CO—O-AD-O]$_y$—CO-AA1-CO—O-M-(O—[CO-AA1-CO—O-D1]$_x$—O—[CO-AA1-CO—O-AD-O]$_y$—H)$_{n-1}$, wherein O-D1-O represents the residual of the diol functionality, wherein CO-AA1-CO represents the residual of the aliphatic dicarboxylic acid functionality, wherein O-AD-O represents the residual of the polyamid diol functionality, wherein x and y are the number of each of the repeat units in the polymer, the number average molecular weight of the transformed polymer being greater than 4,000 grams per mole.

Preferably, when the polymer is contacted with the polyacid ester the transformed material will comprise the following repeat units: —[H1-AA]-, —[R—O-AA]-, and -M-(CO—O—R)$_n$—. Thus, according to one representation (with a single polyfunctional moiety M built in the chain, though a plurality of M is possible) the transformed polymer may have the formula HO-D1-O—[—CO-AA1-CO—O-D1-O—]$_x$—[CO-AA1-CO—O-AD-O]$_y$—CO-M-(CO—O-D1-[O—OC-AA1-CO—O-D1-O]$_x$—[CO-AA1-CO—O-AD-O]$_y$—H)$_{n-1}$, wherein O-D1-O represents the residual of the diol functionality, wherein CO-AA1-CO represents the residual of the aliphatic dicarboxylic acid functionality, wherein O-AD-O represents the residual of the polyamid diol functionality, wherein x and y are the number of each of the repeat units in the polymer, the number average molecular weight of the transformed polymer being greater than 4,000 grams per mole. Note that while for convenience the repeat units are as shown above, the polymer is not necessarily a block copolymer. Rather the polymer will preferably have segments with an average of 2 repeat units of the same type per segments. Order of addition and time of addition of monomers will impact blockiness of the structure.

In the first embodiment, when the first repeat unit comprises residual of a bis diamide diol and the polymer comprises residual a volatile aliphatic dicarboxylic acid, the first repeat unit may be represented by the structure: —[H1-SA]-, where H1 is —R—CO—NH—R—NH—CO—R—O— or —R—NH—CO—R—CO—NH—R—O— where R is indendently in each occurrence an aliphatic or heteroaliphatic, alicyclic or heteroalicyclic or aromatic or heteroaromatic group, preferably R is an aliphatic group of 1 to 10, preferably 1-4 carbon atoms and SA is a —CO—R'—CO—O— where R' is a short aliphatic group, preferably 1-4 carbon atoms. The second repeat unit may be represented by the formula -[D-SA]-, where D is —[R—O]— and R is a an aliphatic or heteroaliphatic, alicyclic or heteroalicyclic or aromatic or heteroaromatic group. The molecular weight of the polymer is less than 2000 grams per mole. This polymer is reacted with a high boiling or high molecular weight diacid or diacid ester, represented by the formula R'OOC-HA-COOR' where HA is a an aliphatic or heteroaliphatic, alicyclic or heteroalicyclic or aromatic or heteroaromatic group of 5 or more carbon atoms and R' can be H or a monovalent organic group. The temperature for the reaction is sufficiently high to produce a polymer having a number average molecular weight of 4000 g/mol or more and comprising the following repeat units —[H1-SA]-, -[D-SA]-, and one or both of —[H1-OOC—HA-COO]— and -[D-OOC—HA-COO]—. Thus, according to one representation the polymer may be represented by the formula HO-D1-O-[—CO-AA1-CO—O-D1-O—]$_x$—[CO-AA1-CO—O-AD-O]$_y$—H, wherein O-D1-O represents a residual of a diol functionality, wherein CO-AA1-CO represents a a residual of a short aliphatic dicarboxylic acid functionality, wherein O-AD-O represents a a residual of a short symmetrical, crystallizing polyamid diol functionality, wherein x and y are the number of each of the repeat units in the polymer, the number average molecular weight of the polymer being less than 2,000 grams per mole, and the high boiling point diacid ester is represented by the formula RO—CO-AA2-CO—OR. The polymer and the high boiling point diacid ester are combined to form a mixture and heated to form a transformed polymer having the formula HO-D1-O—[—CO-AA1,2-CO—O-D1-O—]$_x$—[CO-AA1, 2-CO—O-AD-O]$_y$—H, wherein CO-AA1,2-CO represents the residual of the aliphatic dicarboxylic acid functionality or the high boiling point diacid ester functionality, wherein O-AD-O represents the residual of the polyamid diol functionality, wherein x and y are the number of each of the repeat units in the polymer, the number average molecular weight of the transformed polymer being greater than 4,000 grams per mole. Note that while for convenience the repeat units are as shown above, the polymer is not necessarily an AB block copolymer. Rather the polymer will preferably have segments with an average of 2 repeat units of the same type per segments. Order of addition and time of addition of monomers will impact blockiness of the structure.

In yet another embodiment, the instant invention is a polymer formed by the branching reactions above. Thus, the invention is a polymer having a number average molecular weight greater than 4000 grams per mole and comprising the following repeat units: —[H1-AA]-, —[R—O-AA]-, and either -M-(AA)$_n$- or -M-(CO—OR)n-. As one representation (with a single polyfunctional moiety M built in the chain, though a plurality of M is possible), the polymer may have the formula HO-D1-O—[—CO-AA1-CO—O-D1-O—]$_x$—[CO-AA1-CO—O-AD-O]$_y$—CO-AA1-CO—O-M-(O—[CO-AA1-CO—O-D1]$_x$—O—[CO-AA1-CO—O-AD-O]$_y$—H)$_n$—, wherein O-D1-O represents the residual of a diol functionality, CO-AA1-CO represents the residual of an aliphatic dicarboxylic acid functionality, O-AD-O represents the residual of a short symmetrical, crystallizing polyamid diol functionality, M is as defined above, n is 3 or more, and wherein x and y are the number of each of the repeat units in the polymer and the number average molecular weight is 4000 grams/mole or more. As another representation (with a single polyfunctional moiety M built in the chain, though a plurality of M is possible), the polymer may have the formula HO-D1-O—[—CO-AA1-CO—O-D1-O—]$_x$—[CO-AA1-CO—O-AD-O]$_y$—CO-M-(CO—O-D1-[O—OC-AA1-CO—O-D1-O]X—[CO-AA1-CO—O-AD-O]$_y$—H)$_{n-1}$, wherein M is as defined above, wherein n is 3 or more, wherein O-D1-O represents the residual of a diol functionality, wherein CO-AA1-CO represents the residual of a short aliphatic dicarboxylic acid functionality, wherein O-AD-O represents the residual of a short symmetrical, crystallizing polyamid diol functionality, wherein x and y are the number of each of the repeat units in the polymer, the number average molecular weight of the transformed polymer being greater than 4,000 grams per mole. Note that while for convenience the repeat units are as shown above, the polymer is not necessarily a strict block copolymer. Rather the polymer will preferably have segments with an average of 2 repeat units of the same type per segments. Order of addition and time of addition of monomers will impact blockiness of the structure.

According to the first embodiment, when the first repeat unit comprises residual of a diamide diester, and the polymer comprises residual of a volatile diol, the first repeat unit may be represented by the structure: —[H2-D]-, where H2 is —CO—R—CO—NH—R—NH—CO—R—CO—O— where R is indentently in each occurrence an aliphatic or heteroaliphatic, alicyclic or heteroalicyclic or aromatic or heteroaromatic group, preferably R is an aliphatic group of 1 to 10, preferably 2-4 carbon atoms and where D is —[R—O]— and R is a an aliphatic or heteroaliphatic, alicyclic or heteroalicyclic or aromatic or heteroaromatic group. The second repeat unit may be represented by the formula -[D-AA]-, where AA is a —CO—R'—CO—O— where R' is an aliphatic group, preferably of 1 to 10, preferably 1-4 carbon atoms. At least one of D and preferably the D in the second repeat unit is DV. DV is —[R"—O]— and R" is a an aliphatic or heteroaliphatic, alicyclic or heteroalicyclic or aromatic or heteroaromatic group selected such that R"(OH)$_2$ can be distilled off from the reaction mixture. Preferably, R" is an aliphatic group of 1 to 8, more preferably 1 to 4, carbon atoms. The molecular weight of the polymer is less than 2000 grams per mole.

Thus, according to one representation the polymer may have the formula HO-D1-O-[—CO-AA1-CO—O-D1-O—]$_x$—[O-D1-O—CO-DD-CO]$_y$—OH, wherein O-D1-O represents residual of a volatile diol functionality, wherein CO-AA1-CO represents a residual of short aliphatic dicarboxylic acid functionality, wherein O—CO-DD-CO—O represents residual of a short symmetrical, crystallizing diamide diacid functionality, wherein x and y are the number of each of the repeat units in the polymer, the number average molecular weight of the polymer being less than 2,000 grams per mole.

The method in this instance comprises providing the above polymer with a nonvolatile diol having the formula HO-D2-OH to form a mixture, at a temperature such that the polymer and the nonvolatile diol react to form a polymer having a number average molecular weight of 4000 g/mol or more and repeat units —[H2-D]-, —[H2-O-D2]-, [D-AA]- (preferably, -[DV-AA]-), and -[D2-O-AA]-. The temperature during the reaction is sufficiently high such that at least some of the DV groups will be distilled off during the reaction and replaced by -D2-O— groups. Thus, according to one embodiment the transformed polymer may be represented by the formula HO-D2-O—[—CO-AA1-CO—O-D1,2-O—]$_x$—[O-D1,2-O—CO-DD-CO]$_y$—OH, wherein O-D2-O represents the residual of the nonvolatile diol functionality, wherein CO-AA1-CO represents the residual of the aliphatic dicarboxylic acid functionality, wherein O—CO-DD-CO—O represents the residual of the diamide diacid functionality, wherein O-D1,2-O represents the residual of the volatile diol functionality or the nonvolatile diol functionality, wherein x and y are the number of each of the repeat units in the polymer, the number average molecular weight of the transformed polymer being greater than 4,000 grams per mole. Note that while for convenience the repeat units are as shown above, the polymer is not necessarily a strict block copolymer. Rather the polymer will preferably have segments with an average of 2 repeat units of the same type per segments. Order of addition and time of addition of monomers will impact blockiness of the structure.

In the second embodiment, when the first repeat unit comprises residual of a bisamide diester, the first repeat unit may be represented by the structure —[H2-D]- as discussed above and the second repeat unit has the structure —[R—O-AA]- where R is as defined above. Thus, according to one representation the polymer may be represented by the formula HO-D1-O—[—CO-AA1-CO—O-D1-O—]$_x$—[O-D1-O—CO-DD-CO]$_y$—OH, wherein O-D1-O represents residual of a diol functionality, wherein CO-AA1-CO represents residual of a aliphatic dicarboxylic acid functionality, wherein O—CO-DD-CO—O represents residual of a short symmetrical, crystallizing diamide diacid functionality, wherein x and y are the number of each of the repeat units in the polymer. The number average molecular weight of the polymer is less than 2,000 grams per mole. Note that while for convenience the repeat units are shown as the above structure the polymer is not necessarily an AB block copolymer. Rather the polymer will preferably have segments with an average of 2 repeat units of the same type per segments. Order of addition and time of addition of monomers will impact blockiness of the structure.

The method of this second embodiment comprises contacting the polymer with a polyol having the formula $M\text{-}(OH)_n$ or a polyacid ester having the formula $M\text{-}(COOR1)n$ to form a mixture wherein M is an n valent organic moiety, preferably aliphatic or heteroaliphatic, alicyclic or heteroalicyclic or aromatic or heteroaromatic group, preferably having up to 20 carbon atoms, R1 is hydrogen or an aliphatic group of 1-10 carbon atoms and wherein n is 3 or more, the temperature of the mixture being sufficiently high to produce a transformed material having a branched structure and a number average molecular weight greater than 4000.

Preferably, when the polymer is reacted with the polyol, the transformed material will comprise the following repeat units: —[H2-D]-, —[R—O-AA]-, and -M-$(AA)_n$-. According to one embodiment this transformed polymer may be represented by the formula (with a single polyfunctional moiety M built in the chain, though a plurality of M is possible): HO-D1-O—[—CO-AA1-CO—O-D1-O—]$_x$—[O-D1-O—CO-DD-CO—]$_y$—O-M-(O—[CO-AA1-CO—O-D1]$_x$—O—[O-D1-O—CO-DD-CO]$_y$—OH)$_{n-1}$, wherein O-D1-O represents the residual of the diol functionality, wherein CO-AA1-CO represents residual of the aliphatic dicarboxylic acid functionality, wherein O—CO-DD-CO—O represents residual of the diamide diacid functionality, wherein x and y are the number of each repeat units in the polymer.

Preferably, when the polymer is contacted with the polyacid ester the transformed material will comprise the following repeat units: —[H2-AA]-, —[R—O-AA]-, and -M-$(COOR)_n$—. Thus, according to one representation (with a single polyfunctional moiety M built in the chain, though a plurality of M is possible) the transformed polymer may be represented by the formula HO-D1-O—[—CO-AA1-CO—O-D1-O—]$_x$—[OC-DD-CO—O-D1-O]$_y$OC-M-([—CO—O-D1-O—CO-AA1-CO—]$_x$[O-D1-O—CO-DD-CO]$_y$—OH)$_{n-1}$, wherein O-D1-O represents the residual of the diol functionality, wherein CO-AA1-CO represents residual of the aliphatic dicarboxylic acid functionality, wherein O—CO-DD-CO—O represents residual of the diamide diacid functionality, wherein x and y are the number of each of the repeat units in the polymer. Note that while for convenience the repeat units are shown as the above structure the polymer is not necessarily a strict block copolymer. Rather the polymer will preferably have segments with an average of 2 repeat units of the same type per segments. Order of addition and time of addition of monomers will impact blockiness of the structure.

In the first embodiment when the first repeat unit comprises residual of a diamide diester and the polymer comprises residual a volatile aliphatic dicarboxylic acid, the first repeat unit may be represented by the structure: —[H2-D]- and the second repeat unit may be represented by the formula -[SA-D]-, where H2 SA are as defined above and D is —[R—O]— and R is a an aliphatic or heteroaliphatic, alicyclic or heteroalicyclic or aromatic or heteroaromatic group. The molecular weight of the polymer is less than 2000 grams per mole. This polymer is reacted with a high boiling or high molecular weight diacid or diacid ester, represented by the formula R'OOC—HA-COOR' where HA is a an aliphatic or heteroaliphatic, alicyclic or heteroalicyclic or aromatic or heteroaromatic group of 5 or more carbon atoms and R' can be H or a monovalent organic group. The temperature for the reaction is sufficiently high to produce a polymer having a number average molecular weight of 4000 g/mol or more and comprising the following repeat units —[H2-D]-, —[SA-D]-, and -[D-OOC—HA-COO]—.

Thus, according to one representation the polymer may be represented by the formula HO-D1-O—[—CO-AA1-CO—O-D1-O—]$_x$—[O-D1-O—CO-DD-CO]$_y$—OH, wherein O-D1-O represents residual of a diol functionality, wherein CO-AA1-CO represents residual of a short aliphatic dicarboxylic acid functionality, wherein O—CO-DD-CO—O represents residual of a short symmetrical, crystallizing diamide diacid functionality, wherein x and y are the number of each of the repeat units in the polymer, the number average molecular weight of the polymer being less than 2,000 grams per mole. According to this representation the polymer is contacted with a high boiling point diacid ester having the formula RO—CO-AA2-CO—OR to form a mixture, the temperature of the mixture being sufficiently high to produce a transformed material comprising a transformed polymer represented by the formula HO-D1-O—[—CO-AA1,2-CO—O-D1-O—]$_x$—[CO-AA1,2-CO—O—CO-DD-CO]$_y$—OH, wherein CO-AA1,2-CO represents residual of the aliphatic dicarboxylic acid functionality or the high boiling point diacid ester functionality, wherein O—CO-DD-CO—O represents residual of the diamide diacid functionality, wherein x and y are the number of each of the repeat units in the polymer, the number average molecular weight of the transformed polymer being greater than 4,000 grams per mole. Note that while for convenience the repeat units are shown as the above structure the polymer is not necessarily a strict block copolymer. Rather the polymer will preferably have segments with an average of 2 repeat units of the same type per segments. Order of addition and time of addition of monomers will impact blockiness of the structure.

In yet another embodiment, the instant invention is a polymer formed by the branching reactions above. Thus, the invention is a polymer having a number average molecular weight greater than 4000 grams per mole and comprising the following repeat units: —[H2-D]-, —[R—O-AA]-, and either -M-$(AA)_n$- or -M-$(COOR)n$-. Thus, according to one embodiment the polymer may be represented by the formula (with a single polyfunctional moiety M built in the chain, though a plurality of M is possible) HO-D1-O—[—CO-AA1-CO—O-D1-O—]$_x$—[O-D1-O—CO-DD-CO—]$_y$—O-M-(O—[CO-AA1-CO—O-D1]$_x$—O—[O-D1-O—CO-DD-CO]$_y$—OH)$_{n-1}$, wherein O-D1-O represents residual of a diol functionality, wherein CO-AA1-CO represents residual of a short aliphatic dicarboxylic acid functionality, wherein O—CO-DD-CO—O represents residual of a short symmetrical, crystallizing diamide diacid functionality, wherein M is as defined above, wherein n is 3 or more, and wherein x and y are the number of each of the repeat units in the polymer. According to another representation (with a single polyfunctional moiety M built in the chain, though a plurality of M is possible) the polymer may be of the HO-D 1-O—[—CO-AA1-CO—O-D1-O—]$_x$—[OC-DD-CO—O-D1-O]$_y$OC-M-([—CO—O-D1-O—CO-AA1-CO—]$_x$[O-D1-O—CO-DD-CO]$_y$—OH)$_{n-1}$, wherein M is as defined above, wherein n is 3 or more, wherein O-D1-O represents residual of a diol functionality, wherein CO-AA1-CO represents residual of a short aliphatic dicarboxylic acid functionality, wherein O—CO-DD-CO—O represents residual of a short symmetrical, crystallizing diamide diacid functionality, wherein x and y are the number of each of the repeat units in the polymer, the number average molecular weight of the transformed polymer being greater than 4,000 grams per mole.

Although U.S. Pat. No. 6,172,167 teaches a process for producing aliphatic polyester-amide compositions and methods for making, the process of the '167 patent is relatively time consuming when it is desired to produce polymers having a molecular weight of 4,000 grams per mole or more. The instant invention provides a relatively rapid process for producing polymers having a molecular weight of 4,000 grams per mole or more.

The instant invention starts with a preliminary polymer as discussed above. The use of the short symmetrical, crystallizing amide diol or diamide diester functionality in the initial polymer followed by the step of increasing its molecular weight by, for example, reaction with a nonvolatile diol, is believed to be important to produce an increased molecular weight polymer composition having superior mechanical properties and excellent phase segregation.

As taught in U.S. Pat. No. 6,172,167, herein fully incorporated by reference, such prepolymers polymers can be made from reaction mixtures comprising an amide diol. Amide diols which are particularly useful in the practice of the invention have the following structure;

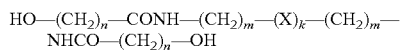

Wherein X is NH, O or S, k is from 0 to l, m is from 1 to 4 and n is from 4 to 6.

The amide diol can be prepared by any suitable means, however it has been found advantageous to prepare the amide diol by the ring opening polymerization (ROP) reaction between at least one primary diamine and at least one lactone. The preparation of the amide diol can also be carried out according to the methods described in U.S. Pat. No. 3,025,323 and in "Synthesis of Alternating Polyamideurethanes by Reacting Diisocyanates with N,N'-Di-(6-hydroxycaproyl) alkylenediamines and N-hydroxy-alkyl-6-hydroxycaproamide" by S. Katayama et al in J. Appl. Polym. Sci., Vol. 15, 775-796 (1971).

A primary diamine is defined in this specification as an organic compound comprising two primary amine groups. The primary diamine may also comprise secondary and tertiary amine groups. Suitable diamines are ethylene diamine, diethylene triamine, butane diamine and hexane diamine.

The lactone preferably has 4, 5 or 6 carbon atoms. Suitable lactones include γ-butyrolactone, δ-valerolactone, ε-caprolactone, pentadeca lactone, glycolide and lactides. The preferred method of carrying out such reaction is to mix, in a stainless steel stirred-tank reactor, the lactone with the diamine in a ratio of at least 2 mol of lactone per mol of diamine, preferably in a ratio of 2.0 to 2.5 mol of lactone per mol of diamine. The reaction is preferably carried out under a nitrogen blanket. The reactants may be dissolved in a solvent, but generally it is preferable to carry out the reaction in the absence of a solvent in order to eliminate the effort required in separating the solvent from the polymer composition product. Preferably the reaction temperature is maintained at a temperature which is lower than the melting point of the pure amide diol, preferably between 50 degrees Celsius (° C.) and 90° C. by controlling the reaction exotherm by efficient cooling, which generally results in a product comprising a high fraction of the desired amine diol product which can be used in subsequent process steps without the need for further purification. If the reaction is carried out in the absence of a solvent the whole contents of the reactor will generally solidify. It is generally advantageous to allow the reaction mixture to cool down to ambient temperature and to allow the reaction product to stand for several hours, preferably for more than 6 hours, more preferably for more than 12 hours to allow any remaining diamine to react. The amide diol product may then be removed from the reactor by heating the reactor contents, preferably under a suitable inert gas blanket, until the product melts.

Alternatively the amide diol can have the following general structure

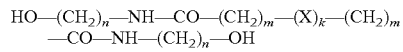

prepared by reacting a dicarboxylic acid ester (e.g. diethyl oxalate [m=k=0] or dimethyl adipate [m=2 and k=0]) with a stoichiometric amount of an alkanolamine such as ethanolamine (n=2). The reaction may be catalysed using a catalyst such as stannous octoate, tetrabutoxy titanium (IV) or phenol.

A particularly preferred amide diol is the dimer prepared from ethylene diamine and ε-caprolactone which has the following structure:

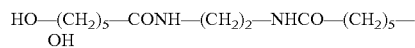

The aliphatic polyester-amide polymer having a molecular weight less than 2000 grams per mole can be made by contacting an amide diol with a low molecular weight dicarboxylic acid diester and a low molecular weight diol, heated to liquefy the mixture after which the catalyst is injected.

Low molecular weight dicarboxylic acid diesters are defined having a molecular weight less than 150 grams per mole. The alkyl moieties of the dicarboxylic acid diester are preferably the same or different and have between 1 and 3 carbon atoms. Preferably the alkyl moieties are methyl groups. The dicarboxylate moiety of the dicarboxylic acid diester preferably has between 2 and 8 carbon atoms, most preferably between 4 and 6 carbon atoms. Preferably the dicarboxylate moiety is a succinate, glutarate or adipate group. Suitable dicarboxylic acid esters include dimethyl succinate, dimethyl adipate, dimethyl oxalate, dimethyl malonate and dimethyl glutarate.

Generally the reaction is carried out in a stirred heated reactor or devolitizer, fitted with a reflux column, under an inert gas blanket. In a preferred embodiment solid amide diol is first mixed with the dicarboxylic acid diester. The mixture of amide diol and dicarboxylic acid diester is then slowly heated up to a temperature of about 140° C. or until such temperature that the amide diol dissolves completely. The mixture of amide diol and dicarboxylic acid diester mixture is then maintained at this temperature for 1.5 to 3 hours. To minimize discoloration the bis-amide diol is first mixed with dimethyladipate at ambient temperature and then the mixture is heated to make it liquid and at the same time it is believed that the most reactive free amine functions are captured by transamidation reaction with dimethyladipate to amide functions. Then the diol is added and finally the catalyst (at a moment when the most aggressive species are believed to have reacted away). The low molecular weight diol is introduced in stoechiometric excess, the mixture is homogenized and finally the catalyst is injected to form the aliphatic polyester-amide polymer having a number average molecular weight less than 2000 grams per mole.

Volatile diols are defined in this specification as having a molecular weight of less than 1,8 octane diol. Suitable diols include monoethylene glycol, 1,3-propanediol, 1,4-butanediol, 1,5 pentane diol, 1,6 hexane diol and 1,7 heptane diol. The volatile diol is added to the polymer and the mixture is generally homogenized by continuous stirring. The temperature is generally maintained at or above the melting temperature of the amide diol, typically at about 140° C. The reaction is preferably carried out under an inert gas blanket at about atmospheric pressure. A catalyst is then preferably added to the reactant mixture. Any suitable compound for catalyzing transesterification and transamidification reactions may be used. Suitable catalysts include tetrabutoxy titanium (IV), zinc acetate and magnesium acetate.

The addition of the volatile diol and optional catalyst results in the evolution of a vapour comprising the low molecular weight alcohol or alcohol mixture corresponding to the alkyl moiety or moieties of the dicarboxylic acid esters, and the formation of the polymer. The vapour formed is distilled off at about atmospheric pressure from the reaction mixture comprising the polymer. The reaction is continued until the evolution of alcohol subsides.

Nonvolatile diols are defined in this specification as having a molecular weight greater than 1,7 heptane diol.

The short symmetrical, crystallizing diamide diacid functionality herein is the same as defined and taught in the above-referenced U.S. Pat. No. 6,172,167 (see especially column 4, line 58 and column 7, line 37).

In this specification high boiling point dicarboxylic acid diesters are defined as aliphatic dicarboxylic acid diesters having a molecular weight greater than 174. The alkyl moieties of the dicarboxylic acid diester are preferably the same or different and have between 1 and 3 carbon atoms. Preferably the alkyl moieties are methyl groups. The dicarboxylic acid moiety preferably has between 7 and 10 carbon atoms, most preferably either 9 or 10 carbon atoms. Preferably the dicarboxylic acid moiety is an azelate or sebacate group or dimer acid group. Preferred dicarboxylic acid esters are dimethyl azelate, dimethyl sebacate and dimethyl suberate.

Suitable nonvolatile diols in the instant invention include higher glycols such as dipropylene glycol or tripropylene glycol, polyethylene glycols (PEG's of molecular weight 400 to 8000) and EO capped polypropylene glycols of molecular weight 400 to 4000), dimer diols or Soy polyols or other high molecular weight natural diols like mentioned in Jetter et al. Phytochemistry 55, 169-176 (2000). Polyols suitable for use in the instant invention include glycerol, trimethylol propane, sorbitol and sucrose (as such but also propoxylated and ethoxylated).

The reaction of the aliphatic polyester-amide polymer with the nonvolatile diol, the polyol, polyacid ester or the high boiling point dicarboxylic acid diester is generally carried out under an inert gas blanket. The mixture is then heated over a period of typically 2 to 3 hours to a temperature of about 180° C. or to such temperature that the resulting amide ester polymer remains in the molten or dissolved state. The pressure is typically about atmospheric pressure. The reaction can result in the evolution of low molecular weight alcohol which is removed by distillation from the system. The pressure in the reactor is then gradually lowered to an absolute pressure of about 5 millibar to initiate the distillation under vacuum of any remaining volatile materials. The resulting polymer composition can then be cooled to about 150° C. and brought to atmospheric pressure, after which the polymer may be removed from the reactor whilst still in the molten state. Catalysts are preferably present from the reaction which formed the pre-polymer in which case additional catalyst need not be added to enable the branching or molecular weight increasing reaction.

The polymers of the instant invention can have mechanical properties (such as strength, stiffness, elasticity and ductility) comparable to those of polyethylene.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

EXAMPLES

Preparation of the amide diol ethylene-N,N"-dihydroxyhexanamide (C2C) monomer

A 10 L stainless steel reactor equipped with an agitator and a cooling water jacket is charged with ε-caprolactone (5.707 kg, 50 moles) and purged with nitrogen. Under rapid stirring EDA (1.502 kg, 25 moles) is added at once. After an induction period a slow exothermic reaction starts. The reactor temperature gradually rises to 90° C. under maximum cooling applied. A white deposit forms and the reactor contents solidify, at which the stirring is stopped. The reactor contents are then cooled to 20° C. and are then allowed to rest for 15 hours. The reactor contents are then heated to 140° C. at which temperature the solidified reactor contents melt; and then further to 160° C. under continued stirring for at least 2 hrs. The liquid product is then discharged from the reactor into a collecting tray. A nuclear magnetic resonance study of the resulting product shows that the molar concentration of C2C in the product exceeds 80 percent. The melting point of the product is determined to be 140° C. The solid material is granulated and used without further purification.

Preparation of Di-Amide Di-Ester Monomer A4A

In a nitrogen atmosphere, titanium (IV) butoxide (0.92 g, 2.7 mmol), ethylene diamine (15.75 g, 0.262 mol), and dimethyl adipate (453.7 g, 2.604 mol) are loaded into a 3-neck, 1 L roundbottom flask that is stoppered and transferred to hood. Flask is placed under positive nitrogen via inlet adaptor attached to a Firestone valve. Stir-shaft with blade is inserted into flask along with stir bearing with overhead stir motor. Stoppered condensor is inserted into flask. A thermocouple inserted thru septa is also inserted into the flask. Flask is warmed with a hemisphere heating mantle that is attached to proportional temperature controller. Basic reaction profile is 2.0 hours to/at 50 C, 2.0 hours to/at 60 C, 2.0 hours to/at 80 C; overnight at 10° C. Flask is slowly cooled with stirring to ~50 C, stirring stopped and cooled to ~ room temperature. Approximately 200 mL of cyclohexane is add to flask with agitation for a filterable slurrry with solid collected on a medium porosity glass filtration funnel. Collected solids are washed twice with ~50 mL of cyclohexane. Product is dried overnight in an ~50 C vacuum oven. Dried product is broken up and re-slurried in fresh cyclohexane (~300 mL), recollected by filtration, rinsed twice with ~50 mL cyclohexane, and dried to constant weight in a 50 C vacuum oven under full pump vacuum. Yield=59.8 grams (66%).

Preparation of the Prepolymers

Example A

Preparation of Prepolymer from C2C, Dimethyl Adipate, and 1,4-Butanediol. Under an inert atmosphere into a 250 mL roundbottom flask is loaded titanium (IV) butoxide (0.194 grams, 0.571 mmol), N,N'-1,2-ethanediyl-bis[6-hydroxyhexanamide] (13.62 grams, 47.22 mmol), dimethyl adipate (65.80 grams, 0.3777 mol), and 1,4-butanediol (59.57 grams, 0.6611 mol). Polymerization reaction is run with overhead stirring, nitrogen/vacuum, heating, and use of a distillation head. Reaction profile is as follows: 2.0 hrs from 160° C. to/at 175° C., N2; 5 minutes, 450 Torr; 10 minutes, 50 Torr; 5 minutes, 40 Torr; 10 minutes, 30 Torr; 10 minutes, 20 Torr; 10 minutes, 15 Torr; 90 minutes, 10 Torr; 1.0 hour, 0.425 to 0.60 Torr. Upon cooling waxy solid has Tm=51° C. (55 J/g); inherent viscosity=0.090 dL/g (chloroform/methanol (1/1, w/w), 30.0° C., 0.5 dL/g); Mn via 1H-NMR~1098; and ~12 mol % C2C incorporation via $^1$H-NMR.

Example B

Preparation of Prepolymer from A4A, Dimethyl Adipate, and 1,4-Butanediol. Under an inert atmosphere into a 250 mL roundbottom flask is loaded titanium (IV) butoxide (0.174 grams, 0.512 mmol), dimethyl 7,12-diaza-6,13-dioxo-1,18-octadecanedioate (31.68 grams, 85.06 mmol), dimethyl adipate (44.45 grams, 0.2552 mol), and 1,4-butanediol (61.33 grams, 0.6805 mol). Polymerization reaction is run with overhead stirring, nitrogen/vacuum, heating, and use of a distillation head. Reaction profile is as follows: 2.0 hrs from 160° C. to/at 175° C., N2; 5 minutes, 450 Torr; 5 minutes, 100 Torr; 10 minutes, 50 Torr; 5 minutes, 40 Torr; 10 minutes, 30 Torr; 10 minutes, 20 Torr; 10 minutes, 15 Torr; 90 minutes, 10 Torr; 1.0 hour, ~0.400 Torr. Upon cooling waxy solid has bimodal Tm=47 and 95° C.; inherent viscosity=0.091 dL/g (chloroform/methanol (1/1, w/w), 30.0° C., 0.5 dL/g); Mn via $^1$H-NMR~1049; and ~24 mol % A4A incorporation via 1H-NMR.

Preparation of the Polymers

Example 1

Reaction of Prepolymer from C2C, Dimethyl Adipate, and 1,4-Butanediol with Polytetrahydrofuran. Under an inert atmosphere into a 250 mL roundbottom flask is loaded titanium (IV) butoxide (0.091 grams, 0.27 mmol), prepolymer from Example A (40.00 grams), and polytetrahydrofuran (10.00 grams, 10.17 mmol, Mn 983, TERATHANE™ 1000). Polymerization reaction is run with overhead stirring, nitrogen/vacuum, heating, and use of a distillation head. Reaction profile is as follows: 1.0 hrs from 160° C. to/at 175° C., N2; 1.0 hours, 0.3 to 0.6 Torr, 175° C.; and 6 hours, ~0.30 Torr, 190° C. Upon cooling tough solid has Tm=57° C. (28 J/g); inherent viscosity=0.60 dL/g (chloroform/methanol (1/1, w/w), 30.0° C., 0.5 dL/g); Mn via $^1$H-NMR~16000.

Example 2

Reaction of Prepolymer from C2C, Dimethyl Adipate, and 1,4-Butanediol with Glycerol Ethoxylate. Into a 250 mL roundbottom flask is loaded antimony oxide (0.0128 grams, 0.0439 mmol), calcium acetate monohydrate (0.0494 grams, 0.280 mmol), prepolymer from Example A (44.00 grams), glycerol ethoxylate (2.00 grams, 2.00 mmol, Mn 999). Polymerization reaction is run with overhead stirring, nitrogen/vacuum, heating, and use of a distillation head. Reaction profile is as follows: ~1.8 hrs from 160° C. to/at 175° C., 0.2 to 0.9 Torr. Upon cooling tough solid has Tm=66° C. (40 J/g); inherent viscosity=0.27 dL/g (chloroform/methanol (1/1, w/w), 30.0° C., 0.5 dL/g).

Example 3

Reaction of Prepolymer from A4A, Dimethyl Adipate, and 1,4-Butanediol with Dimethyl Sebacate. Into a 250 mL roundbottom flask is loaded antimony oxide (0.0128 grams, 0.0439 mmol), calcium acetate monohydrate (0.0494 grams, 0.280 mmol), prepolymer from Example B (44.00 grams), and dimethyl sebacate (2.41 grams, 10.5 mmol). Polymerization reaction is run with overhead stirring, nitrogen/vacuum, heating, and use of a distillation head. Reaction profile is as follows: 2 hrs from 160° C. to/at 175° C., N2; 5 minutes, 450 Torr; 5 minutes, 100 Torr; 10 minutes, 50 Torr; 5 minutes, 40 Torr; 15 minutes, 30 Torr; 15 minutes, 20 Torr; 90 minutes, 10 Torr; 2 hrs, 0.4-0.6 Torr, 175° C.; 2.5 hrs, 0.3-0.4 Torr to/at 190° C. Upon cooling tough solid has bimodal Tm=69, 114° C. (43 J/g); inherent viscosity=0.28 dL/g (chloroform/methanol (1/1, w/w), 30.0° C., 0.5 dL/g); Mn via $^1$H-NMR~7000.

Example 4

Reaction of Prepolymer from A4A, Dimethyl Adipate, and 1,4-Butanediol with Trimethyl 1,3,5-Benzenetricarboxylate. Into a 250 mL roundbottom flask is loaded antimony oxide (0.0128 grams, 0.0439 mmol), calcium acetate monohydrate (0.0494 grams, 0.280 mmol), prepolymer from Example B (44.00 grams), and trimethyl 1,3,5-benzenetricarboxylate (0.529 grams, 2.10 mmol). Polymerization reaction is run with overhead stirring, nitrogen/vacuum, heating, and use of a distillation head. Reaction profile is as follows: 2.3 hrs from 160° C. to/at 175° C., N2; 5 minutes, 100 Torr; 10 minutes, 50 Torr; 5 minutes, 40 Torr; 15 minutes, 30 Torr; 15 minutes, 20 Torr; 90 minutes, 10 Torr; ~2.5 hrs, 0.2-0.6 Torr. Upon cooling tough solid has bimodal Tm=73, 111° C. (44 J/g); inherent viscosity=0.29 dL/g (chloroform/methanol (1/1, w/w), 30.0° C., 0.5 dL/g).

Comparative Example 1

Reaction of C4C and 1,4 butane diol with dimethyl adipate; polyester-amide with 25 mole % C4C units (According to Stapert et al. U.S. Pat. No. 6,172,167 Example 4). Dimethyl adipate (70 g; 0.402 moles) C4C (31.79 g; 0.101 moles) and a two fold excess of 1,4 butane diol (54.07 g; 0.602 moles) were weighted into a reaction vessel and placed under nitrogen atmosphere. The catalyst Ti(OBu)$_4$ was added in an amount of 0.1% by weight based on the total mixture. Methanol was distilled off at a temperature of 175 C for 2 hours. A low vacuum (p→5 mbar) was then applied for 1 hr whereafter the temperature was raised to 185-190 C. at this temperature a high vacuum was applied (p=0.1 bar) in order to remove the excess of 1,4 butane diol for 15-20 hrs. The melt was cooled to crystallize the product.

Comparative Example 2

Reaction of A4A and dimethyl adipate with 1,4 butane diol; polyester-amide with 25 mole % A4A units (According to Stapert et al. U.S. Pat. No. 6,172,167 Example 5). A reaction vessel was loaded with 14.6 g dimethyladipate (0.084 moles), 30.1 g 1,4 butane diol (0.333 moles) and 31.1 g A4A (0.084 moles) and placed under nitrogen atmosphere. Ti(OBu)$_4$ catalyst was added to the mixture in a concentration of 0.1% by weight. The temperature was raised to 175 C over 2 hours to distill off the methanol. A low vacuum was then applied for 1 hour. The temperature was increased to 185-190 C and full vacuum (0.1 mbar) was applied for 5-10 hours to remove the excess 1,4 butane diol.

Amide Ester Polymer Composition Characteristics

Physical properties of the amide ester polymers obtained above are summarized in table 1 below. Number average molecular weights are determined by 1H nuclear magnetic resonance using a Bruker Avance 300 NMR spectrometer with a 5 millimeter probe head. Melting points of the samples are determined by differential scanning calorimetry using a Pyris 1 apparatus available from Perkin Elmer.

Mechanical tests are performed on a samples prepared from compression moulded plaques. Prior to compression moulding the samples are dried at 60° C. for about 24 hours. The plaques are prepared on a Passadena press SQL-430, the samples being subject to compression moulding at 160° C. at 30 tons for about 2 minutes. Following the compression moulding the samples are quench-cooled to room temperature. The plaques thus obtained are 70 millimeters wide, 100 millimeters long and 2 millimeters thick.

TABLE 1

Physical and Mechanical Properties of Amide Ester Polymers

| Polymer | Number Average Molecular Weight | Melting Point (° C.) | Inherent Viscosity (chloroform/ methanol 1:1, w/w) | Ultimate Tensile Strength (MPa) | Elongation at break (%) | Modulus (MPa) |
|---|---|---|---|---|---|---|
| Polymer 1 with pTHF | 16,000 | 57 | 0.6 | 14 | 1700 | 10 |
| Polymer 2 with glycerol ethoxylate | | 66 | 0.27 | 11 | 1000 | 45 |
| Polymer 3 with dimethyl sebacate | 7,000 | 69/114 | 0.28 | | | |
| Polymer 4 with 1,3,5 benzene tricarboxylate | | 73/111 | 0.29 | | | |
| Comparative example 1 | 10,000 | 108 | 0.58 | 15 | 810 | |
| Comparative example 2 | 10,000 | 60/140 | 0.32 | 11 | 790 | 84 |

What is claimed is:

1. A method for increasing the molecular weight of a polymer comprising the steps of
providing a reaction mixture including (i) an initial polymer with a molecular weight of less than 2000 g/mol which initial polymer comprises a first repeat unit, which comprises the residual of a condensation reaction of either a volatile or non-volatile aliphatic dicarboxylic acid with a bisamide diol prepared from a diamine having 6 or fewer carbon atoms or a volatile or non-volatile diol with a diamide diester, and a second repeat unit, which comprises the residual of a condensation reaction of a volatile or non-volatile diol and a volatile or non-volatile aliphatic dicarboxylic acid, provided that at least one of the volatile or non-volatile diol or the volatile or non-volatile aliphatic dicarboxylic acid is the volatile diol or volatile aliphatic dicarboxylic acid, which are characterized in that when found independently in a reaction mixture they may be distilled out of the reaction mixture and (ii) a reactant selected from high boiling point diacid esters having the formula R'OOC—HA-COOR' where HA is an aliphatic or heteroaliphatic, alicyclic or heteroalicyclic or aromatic or heteroaromatic group of 5 or more carbon atoms and R' is a monovalent organic group, non-volatile diols and non-volatile aliphatic dicarboxylic acids, wherein each of the non-volatile aliphatic dicarboxylic acids has 5 or more carbon atoms, wherein the first repeat unit and the second repeat unit are different,
heating the reaction mixture to increase the molecular weight of the polymer to 4000 g/mol or more.

2. The method of claim 1 wherein the initial polymer comprises the residual of the condensation reaction of the volatile or non-volatile aliphatic dicarboxylic acid with the bisamide diol and the residual of the condensation reaction of the volatile diol and the volatile or non-volatile aliphatic dicarboxylic acid and the reactant is a non-volatile diol.

3. The method of claim 2 wherein the initial polymer comprises a first repeat unit represented by the structure: -[H1-AA]-, where H1 is —R—CO—NH—R—NH—CO—R—O— or —R—NH—CO—R—CO—NH—R—O— where R is independently in each occurrence an aliphatic or heteroaliphatic, alicyclic or heteroalicyclic or aromatic or heteroaromatic group and AA is —CO—R'—CO—O— where R' is an aliphatic group and a second repeat unit represented by the formula -[DV-AA]-, where AA is as defined for the first repeat unit, DV is —[R"—O]— and R" is an aliphatic or heteroaliphatic, alicyclic or heteroalicyclic or aromatic or heteroaromatic group selected such that R"(OH)$_2$ is the volatile diol and can be distilled off from the reaction mixture.

4. The method of claim 2 where the initial polymer has the formula HO-D1-O—[—CO-AA1-CO—O-D1-O-]x-[CO-AA1-CO—O-AD-O]y-H, wherein O-D1-O represents a volatile diol functionality, wherein CO-AA1-CO represents a short aliphatic dicarboxylic acid functionality having 6 or fewer carbon atoms, wherein O-AD-O represents a short symmetrical, crystallizing bisamide diol functionality prepared from a diamine having 6 or fewer carbon atoms, wherein x and y are the number of each of the repeat units in the initial polymer, the number average molecular weight of the initial polymer being less than 2,000 grams per mole, comprising the step of: contacting the initial polymer with a nonvolatile diol having the formula HO-D2-OH to form a mixture, the temperature of the mixture being sufficiently high to produce a transformed material comprising a transformed polymer having the formula HO-D2-O—[—CO-AA1-CO—O-D1,2-O—]x-[CO-AA1-CO—O-AD-O]y-H, wherein O-D2-O represents the nonvolatile diol functionality, wherein CO-AA1-CO represents the short aliphatic dicarboxylic acid functionality, wherein O-AD-O represents the short bisamide diol functionality, wherein O-D1,2-O represents the volatile diol functionality or the nonvolatile diol functionality, wherein x and y are the number of each of the repeat units in the transformed polymer, the number average molecular weight of the transformed polymer being greater than 4,000 grams per mole.

5. The method of claim 1 wherein the initial polymer comprises the residual of the condensation reaction of the volatile or non-volatile aliphatic dicarboxylic acid with the bisamide diol and the residual of the condensation reaction of the volatile or non-volatile diol and the volatile aliphatic dicarboxylic acid and the reactant is a non-volatile aliphatic dicarboxylic acid.

6. The method of claim 5 wherein the initial polymer comprises a first repeat unit represented by the structure: -[H1-SA]-, and a second repeat unit represented by the formula -[D-SA]-, where D is —[R—O]—, H1 is —R—CO—NH—R—NH—CO—R—O— or —R—NH—CO—R—CO—NH—R—O—, R is independently in each occurrence an aliphatic or heteroaliphatic, alicyclic or heteroalicyclic or aromatic or heteroaromatic group, SA is a —CO—R'—CO—O— and R' is a short aliphatic group and a second repeat unit may be represented by the formula.

7. The method of claim 1 wherein the initial polymer has the formula HO-D1-O—[—CO-AA1-CO—O-D1-O-]x-[CO-AA1-CO—O-AD-O]y-H, wherein O-D1-O represents a diol functionality, wherein CO-AA1-CO represents a short aliphatic dicarboxylic acid functionality, wherein O-AD-O represents a short symmetrical, crystallizing bisamide diol functionality prepared from a diamine having 6 or fewer carbon atoms, wherein x and y are the number of each of the repeat units in the initial polymer, the number average molecular weight of the initial polymer being less than 2,000 grams per mole, comprising the step of: contacting the initial polymer with a high boiling point diacid ester to form a mixture, the temperature of the mixture being sufficiently high to produce a transformed material comprising a transformed polymer having the formula HO-D1-O—[—CO-AA1,2-CO—O-D1-O-]x-[CO-AA1,2-CO—O-AD-O]y-H, wherein CO-AA1,2-CO represents the aliphatic dicarboxylic acid functionality or the high boiling point diacid ester functionality, wherein O-AD-O represents the short bisamide diol functionality, wherein x and y are the number of each of the repeat units in the transformed polymer, the number average molecular weight of the transformed polymer being greater than 4,000 grams per mole.

8. The method of claim 1 wherein the initial polymer comprises the residual of the condensation reaction of the volatile or non-volatile diol with the diamide diester and the residual of the condensation reaction of the volatile diol and the volatile or non-volatile aliphatic dicarboxylic acid and the reactant is a non-volatile diol.

9. The method of claim 8 where the initial polymer comprises a first repeat unit represented by the structure: -[H2-D]-, where H2 is —CO—R—CO—NH—R—NH—CO—R—CO—O—, where R is independently in each occurrence an aliphatic or heteroaliphatic, alicyclic or heteroalicyclic or aromatic or heteroaromatic group, and where D is —[R—O]— and R is an aliphatic or heteroaliphatic, alicyclic or heteroalicyclic or aromatic or heteroaromatic group and a second repeat unit represented by the formula -[D-AA]-, where AA is a —CO—R'—CO—O— where R' is an aliphatic group, provided the D in at least one of the first and second repeat units is a volatile diol functionality.

10. The method of claim 8 wherein the initial polymer has the formula HO-D1-O—[—CO-AA1-CO—O-D1-O-]x-[O-D1-O—CO-DD-CO—O]y-H, wherein O-D1-O represents a volatile diol functionality, wherein CO-AA1-CO represents a short aliphatic dicarboxylic acid functionality having 6 or fewer carbon atoms, wherein O—CO-DD-CO—O represents a short symmetrical, crystallizing diamide diacid functionality, wherein x and y are the number of each of the repeat units in the initial polymer, the number average molecular weight of the polymer being less than 2,000 grams per mole, comprising the step of: contacting the initial polymer with a nonvolatile diol having the formula HO-D2-OH to form a mixture, the temperature of the mixture being sufficiently high to produce a transformed material comprising a transformed polymer having the formula HO-D2-O—[—CO-AA1-CO—O-D1,2-O-]x-[O-D1,2-O—CO-DD-CO]y-OH, wherein O-D2-O represents the nonvolatile diol functionality, wherein CO-AA1-CO represents the short aliphatic dicarboxylic acid functionality, wherein O—CO-DD-CO—O represents the diamide diacid functionality, wherein O-D1,2-O represents the volatile diol functionality or the nonvolatile diol functionality, wherein x and y are the number of each of the repeat units in the transformed polymer, the number average molecular weight of the transformed polymer being greater than 4,000 grams per mole.

11. The method of claim 1 wherein the initial polymer comprises the residual of the condensation reaction of the volatile or non-volatile diol with the diamide diester and the residual of the condensation reaction of the volatile or non-volatile diol and the volatile dicarboxylic acid and the reactant is a non-volatile dicarboxylic acid.

12. The method of claim 11 wherein the initial polymer comprises a first repeat unit represented by the structure: -[H2-D]- and a second repeat unit represented by the formula -[SA-D]-, where H2 is —CO—R—CO—NH—R—NH—CO—R—CO—O—, where R is independently in each occurrence an aliphatic or heteroaliphatic, alicyclic or heteroalicyclic or aromatic or heteroaromatic group, SA is a —CO—R'—CO—O— where R' is a short aliphatic group having 1-4 carbon atoms, and where D is —[R—O]—.

13. The method of claim 1 wherein the initial polymer has the formula HO-D1-O—[—CO-AA1-CO—O-D1-O-]x-[O-D1-O—CO-DD-CO]y-OH, wherein O-D1-O represents a volatile or non-volatile diol functionality, wherein CO-AA1-CO represents a short aliphatic dicarboxylic acid functionality having 6 or fewer carbon atoms, wherein O—CO-DD-CO—O represents a short symmetrical, crystallizing diamide diacid functionality, wherein x and y are the number of each of the repeat units in the initial polymer, the number average molecular weight of the initial polymer being less than 2,000 grams per mole, comprising the step of: contacting the initial polymer with a high boiling point diacid ester to form a mixture, the temperature of the mixture being sufficiently high to produce a transformed material comprising a transformed polymer having the formula HO-D1-O—[—CO-AA1,2-CO—O-D1-O-]x-[CO-AA1,2-CO—O—CO-DD-CO]y-OH, wherein CO-AA1,2-CO represents the aliphatic dicarboxylic acid functionality or the high boiling point diacid ester functionality, wherein O—CO-DD-CO—O represents the diamide diacid functionality, wherein x and y are the number of each of the repeat units in the transformed polymer, the number average molecular weight of the transformed polymer being greater than 4,000 grams per mole.

14. The method of claim 1, wherein the bisamide diol has the formula HO—$(CH_2)_n$-CONH—$(CH_2)_m$-(X) k-$(CH_2)_m$-NHCO—$(CH_2)_n$-OH, wherein X=NH, O, S, k=0 or 1, m=1-4 and n=4-6.

15. The method of claim 1, wherein the bisamide diol has the formula HO—($CH_2$)n-NH—CO—($CH_2$)m-CO—NH ($CH_2$)n-OH, wherein n=2-4 and m=2-4.

16. The method of claim 1, wherein the non-volatile aliphatic dicarboxylic acid is selected from the group consisting of glutaric acid and adipic acid; and wherein the bisamide diol has a formula selected from the group consisting of HO—($CH_2$)n-CONH—($CH_2$)m-(X)k-($CH_2$)m-NHCO—($CH_2$)n-OH, wherein X=NH, O, S, k=0 or 1, m=1-4 and n=4-6; and HO—($CH_2$)n-NH—CO—($CH_2$)m-CO—NH—($CH_2$)n-OH, wherein n=2-4 and m=2-4.

17. The method of claim 1, wherein the volatile aliphatic dicarboxylic acid is selected from the group consisting of glutaric acid and adipic acid; wherein the non-volatile aliphatic dicarboxylic acid is selected from the group consisting of azelaic acid and sebacic acid; and wherein the bisamide diol has a formula selected from the group consisting of HO—($CH_2$)n-CONH—($CH_2$)m-(X)k-($CH_2$)m-NHCO—($CH_2$)n-OH, wherein X=NH, O, S, k=0 or 1, m=1-4 and n=4-6; and HO—(CH2)n-NH—CO—(CH2)m-CO—NH—(CH2)n-OH, wherein n=2-4 and m=2-4.

18. The method of claim 1, wherein the volatile diol functionality is derived from a volatile diol selected from the group consisting of ethylene glycol, 1,3 propane diol, 1,4 butane diol and 1,6 hexane diol.

19. The method of claim 1, wherein the non-volatile diol functionality is derived from a non-volatile diol having a molecular weight greater than molecular weight of 1,6 hexane diol.

20. A method for increasing the molecular weight of a polymer comprising the steps of
providing a reaction mixture including (i) an initial polymer with a molecular weight of less than 2000 g/mol which initial polymer comprises a first repeat unit, which comprises the residual of a condensation reaction of dimethyl adipate with a bisamide diol prepared from a diamine having 6 or fewer carbon atoms, and a second repeat unit, which comprises the residual of a condensation reaction of 1,4 butane diol and dimethyl adipate, provided that the 1,4 butane diol and dimethyl adipate are characterized in that when found independently in a reaction mixture they may be distilled out of the reaction mixture and (ii) a reactant selected from high boiling point diacid esters having the formula R'OOC—HA-COOR' where HA is an aliphatic or heteroaliphatic, alicyclic or heteroalicyclic or aromatic or heteroaromatic group of 5 or more carbon atoms and R' is a monovalent organic group, non-volatile diols and non-volatile aliphatic dicarboxylic acids, wherein each of the non-volatile aliphatic dicarboxylic acids has 5 or more carbon atoms,
heating the reaction mixture to increase the molecular weight of the polymer to 4000 g/mol or more.

21. The method as in claim 20, further comprising distilling the 1,4 butane diol or dimethyl adipate from the reaction mixture.

* * * * *